United States Patent [19]

Jurida

[11] 4,200,958
[45] May 6, 1980

[54] KITCHEN UTENSIL

[76] Inventor: Vladslav J. Jurida, 370 Ridelle Ave. #303, Toronto, Ontario, Canada, M6B 4B4

[21] Appl. No.: 843,635

[22] Filed: Oct. 19, 1977

[30] Foreign Application Priority Data

Sep. 20, 1977 [CA] Canada .................................. 287111

[51] Int. Cl.² ............................................... A22C 9/00
[52] U.S. Cl. ..................................................... 17/29
[58] Field of Search .......................... 17/29, 25, 30, 27; 83/660; 30/319

[56] References Cited

U.S. PATENT DOCUMENTS

| | | | |
|---|---|---|---|
| 747,260 | 12/1903 | Steltz | 17/29 |
| 965,477 | 7/1910 | Miller | 17/29 |
| 2,092,654 | 9/1937 | Nigh | 17/29 |
| 2,437,069 | 3/1948 | Brownsey | 17/25 |
| 3,501,801 | 3/1970 | La Fleur | 17/29 |

Primary Examiner—Willie G. Abercrombie

[57] ABSTRACT

A meat tenderizer is disclosed having a handle member and a spool rotatably mounted by said handle member. The spool receives thereon, in combination, a plurality of tenderizing blades each provided with teeth and held in spaced relation by a plurality of ring-like spacer elements. The tenderizing blades and the spacer elements are positioned on the spool whereby the teeth of the tenderizing blades are maintained in a staggered relationship.

3 Claims, 7 Drawing Figures

KITCHEN UTENSIL

BACKGROUND OF THE INVENTION

This invention relates to means for tenderizing meats and more particularly to roller machines for pulling and stretching the meat.

In some cultures it is a custom to "tenderize" meats mechanically prior to cooking. This process involves stretching, perforating or pounding the meat in an attempt to break down the cell structure to facilitate the cooking and eating.

The original and most popular form of mechanical tenderizer was a hammer which was provided with a head which had a plurality of projections thereon to "pull" the meat through hammering.

A second form resembles a roller and it is to this second species that the present invention belongs.

Previously, tenderizers of the second type have been inefficient, difficult to use and expensive to produce. They have usually comprised a structure which has a roller with knife blades mounted therein but such structures are expensive to manufacture and difficult to clean. In some prior roller structures the knife blades were rotated so that the "tenderizing" has been ineffective in that they were relatively static with respect to the meat. In others, it has been difficult to remove the blades for cleaning.

SUMMARY OF THE PRESENT INVENTION

It is the object of the present invention to provide a meat tenderizer which is relatively inexpensive to manufacture, and more efficient than prior corresponding structures.

To achieve this object, there is provided in accordance with this present invention a machine for tenderizing meat which comprises: a handle; a spool rotatably mounted on said handle; a plurality of blades mounted on said spool; said blades each comprising a substantially ring-like body with regularly spaced apart teeth extending radially therefrom beyond said spool; a plurality of ring-like spacer elements, one mounted between each blade; and means for orienting and maintaining each individual blade in an alternately projecting relationship with respect to the adjacent blades.

These and other features will become more evident from the following drawings and description in which a specific embodiment and several preferred embodiments are described by way of example and in which.

Figure 1:
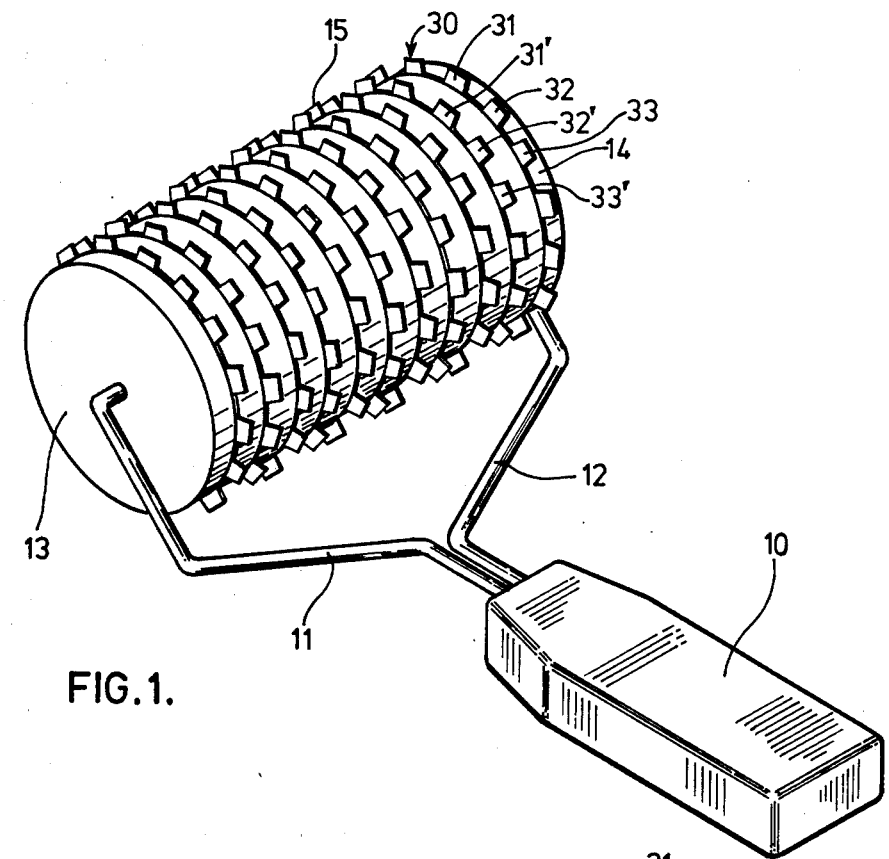
FIG. 1 is a general perspective view of a meat tenderizer in accordance with the present invention.
Figure 3:
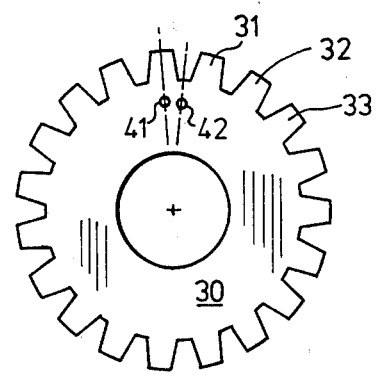
FIGS. 3 and 4 are alternative embodiments of blades employed in the meat tenderizer in accordance with the present invention.
Figure 4:
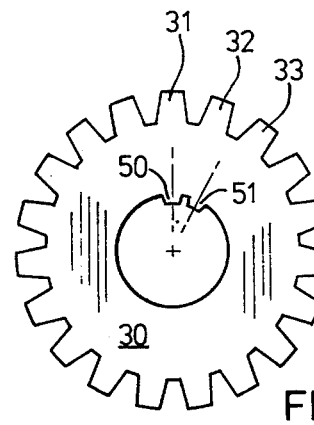
Figure 6:
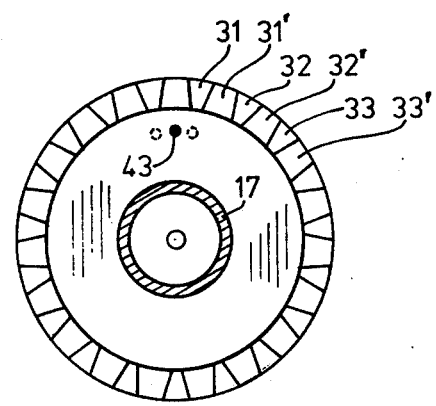
Figure 7:
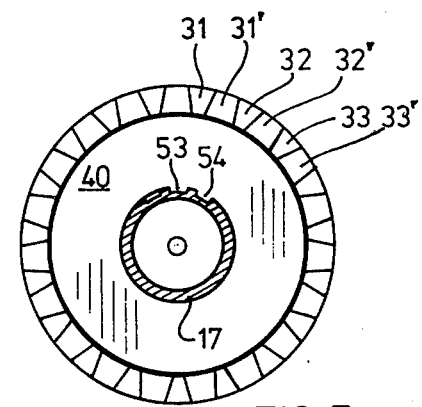
Figure 5:
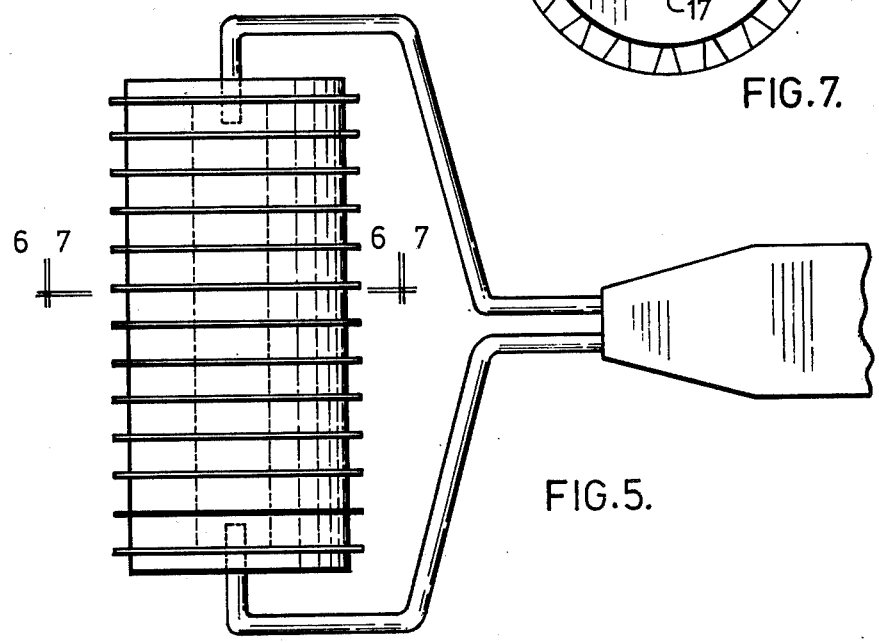

FIG. 5 is a schematic plan view of the meat tenderizer as illustrated in FIG. 1; and FIGS. 6 and 7 are schematic sections taken along lines 6—6 and 7—7 of FIG. 5 showing the method of mounting the blades illustrated in FIGS. 3 and 4 respectively, in or on the meat tenderizer illustrated in FIG. 5.

Referring now to the drawings, it will be observed that from the general perspective view illustrated in FIG. 1, a meat tenderizing machine in accordance with the present invention comprises a handle, generally indicated at 10, from which two arms 11 and 12 project to engage the respective adjacent ends 13 and 14 of a spool 15.

Figure 2:
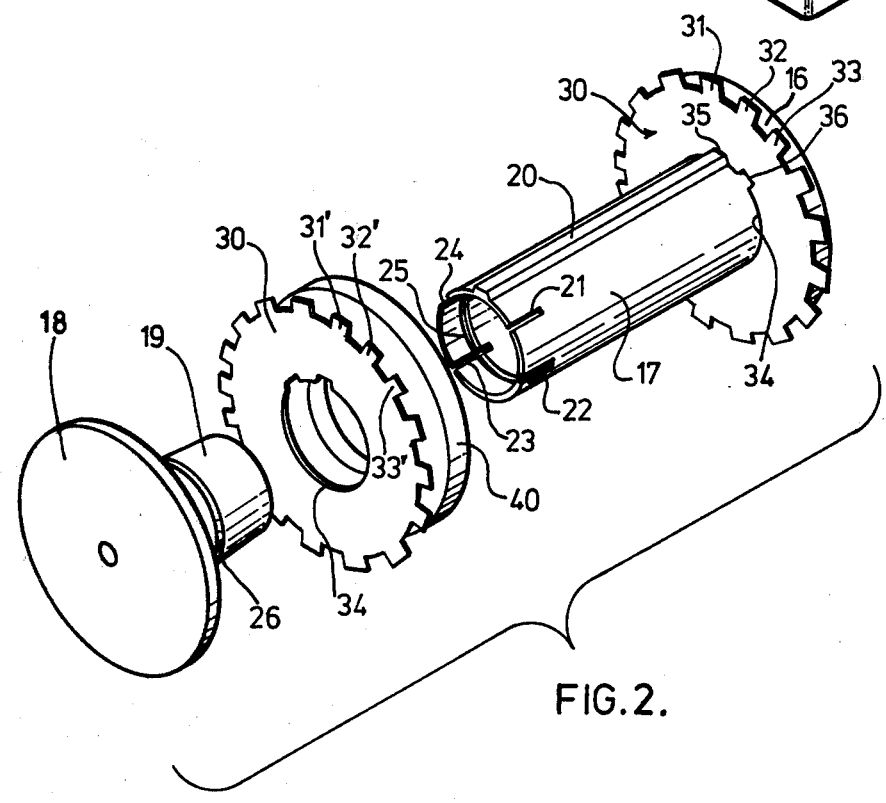
FIG. 2 is an exploded view of a spool employed in a preferred embodiment of the present invention and serves to illustrate the method of mounting the respective components on the spool.

As illustrated in FIG. 2, the preferred embodiment of the spool comprises two sections — the first comprising a cap 16 with a cylinder 17 extending from the centre thereof and a second cap 18 with a mating cylinder 19. Cylinder 17 is divided with a keyway 20 and slots such as 21, 22, 23 and 24 at the remote end from cap 16. On the inner surface of cylinder 17, a groove or channel 25 is provided which matingly engages with a collar 26 on cylinder 19. On the cylinder 17, a plurality of blades such as 30 are mounted. These blades each comprise a circular plate from which a series of spaced-apart radial projections such as 31, 32 and 33 extend.

The plate of a blade 30 is provided with a circular opening 34 which is of the same diameter as the outside diameter of cylinder 17 and each of the central plate openings 34 is provided with a pair of keyways such as 35 and 36 which engage with the projection 20 on cylinder 13.

As will be evident from FIG. 1 on cylinder 17, a series of blades such as 30 are mounted and these blades are spaced apart by collars such as 40 illustrated in FIG. 2.

Each blade 30 is substantially identical and it will be seen from FIG. 2 by orienting the keyway and projection so that the teeth or projections such as 31, 32 and 33 on the alternate blades are staggered as indicated at 31′, 32′ and 33′.

In the embodiment illustrated in FIG. 3, the blades 30 are provided with holes 41 and 42 which mate with a pin 43 on the spacers 40. By alternating the engagement of the pin 43 with holes such as 41 and 42, the relationship between the blades and the spacers is varied as is shown in FIG. 6.

In the embodiments shown in FIG. 4, the blades 30 are provided with inwardly-extending projections such as 50 and 51 which mate with channels such as 53 and 54 on cylinder 17 and again the orientation of the projections on the teeth on the blades 30 are staggered as illustrated in FIG. 7.

The two handle sections 11 and 12 may be held resiliently or may be sprung outwardly such that when the handle section 10 is pressed on, they are held firmly and the entire structure is held securely together.

From the foregoing, it will be seen that as the structure is pulled across a section of meat, the various projections such as 31, 32 and 33 will engage with and stretch the meat or pull or cut it depending upon the force employed and the meat will be "tenderized".

It will also be observed that the structure of the entire spool assembly rotates in unison and the orientation between the different plates and the collars will be maintained so that the device is efficient and there will be no slippage between the different components.

It will obviously be noticed that the structure is easy to assemble and to clean.

I claim:

1. In a machine for tenderizing meat, said machine having a handle member and a spool rotatably mounted by said handle member, the combination comprising:
    a plurality of tenderizing blades mounted on said spool, said blades each comprising a plate-like body with spaced apart teeth extending radially therefrom beyond said spool;

a plurality of ring-like spacer elements separate from said blades and mounted on said spool between adjacent blades;

means for orienting and maintaining the teeth of each individual blade in an alternately projecting relationship relative to the teeth of an adjacent blade; and said spool comprises a first section having a first end cap and a first cylinder projecting therefrom and a second section having a second end cap and a second cylinder projecting therefrom, said first cylinder being engaged in said second cylinder.

2. A machine as claimed in claim 1 wherein said second cylinder has an annular groove in an internal surface adjacent an end of said first cylinder remote from said first end cap, and said first cylinder has a collar engaged in said groove.

3. A machine as claimed in claim 2 wherein said second cylinder has longitudinally extending slots extending from said end of said cylinder past said annular groove.

* * * * *